United States Patent [19]
Feldman

[11] Patent Number: 5,587,810
[45] Date of Patent: Dec. 24, 1996

[54] COMMUNICATION APPARATUS FOR DISABLING MESSAGES SPECIFYING NON-STANDARD COMMUNICATION FEATURES

[75] Inventor: Howard R. Feldman, Kenton, England

[73] Assignee: International Mobile Satellite Organization, London, England

[21] Appl. No.: 212,161

[22] Filed: Mar. 14, 1994

[51] Int. Cl.$^6$ .............................. H04N 1/41; H04N 1/32; H04N 1/40; H04N 1/00
[52] U.S. Cl. .................. 358/442; 358/431; 358/434; 358/438; 358/439; 379/100; 370/466; 395/500
[58] Field of Search .................... 358/431, 434, 358/438, 439, 442; 379/100, 418; 375/216, 377; 455/33.1; 370/85.13; 395/500

[56] References Cited

U.S. PATENT DOCUMENTS

| | | | |
|---|---|---|---|
| 5,293,253 | 3/1994 | Kida et al. | 358/434 |
| 5,303,066 | 4/1994 | Kawaguchi | 358/434 |
| 5,430,863 | 7/1995 | Kmiec | 395/500 |
| 5,461,488 | 10/1995 | Witek | 395/500 |

FOREIGN PATENT DOCUMENTS

| | | |
|---|---|---|
| 0116650 | 8/1984 | European Pat. Off. . |
| 0314122 | 5/1989 | European Pat. Off. . |
| 0505860 | 9/1992 | European Pat. Off. . |
| 92/02100 | 2/1992 | WIPO . |

OTHER PUBLICATIONS

Inmarsat-B System Definition Manual, Issue 3.0, Section 3.5.8, p. III-12 (Nov. 1991).

S. Dimolitas, J. H. Rieser, and H. Feldman; "Real-time Transmission of Group 3 Facsimile over Interconnected Public Switched Digital Mobile Satellite Networks"; 8276 (Comsat Technical Review) 22 1992, No. 1; pp. 125–145.

K. C. Halton, "The Evolution and Future of Group 3 Facsimile Standards", BT Technology Journal, vol. 12, No. 1, pp. 53–60 (1994).

Dimolitsas et al., "Group 3 Facsimile Transmission over Digital Satellite Land Mobile Netowrks", Vehicular Technology Society, 42nd VTS Conference, vol. 1, pp. 240–246 (1992).

Primary Examiner—Kim Vu
Assistant Examiner—Kimberly A. Williams
Attorney, Agent, or Firm—Banner & Witcoff, Ltd.

[57] ABSTRACT

A facsimile interface unit, which encodes signals from a facsimile terminal for transmission by satellite, can only encode signals which conform to the Group 3 standard. The interface unit intercepts signals which identify non-standard features supported by the terminal and replaces them by a modified signal of the same format which does not identify any non-standard features. Another facsimile terminal receiving the modified signal is prevented from enabling any non-standard features and signals to the first facsimile terminal that the Group 3 standard is to be followed. Therefore, the facsimile interface unit is able to encode and decode signals successfully during the subsequent transmission.

26 Claims, 4 Drawing Sheets

COMMUNICATION APPARATUS FOR DISABLING MESSAGES SPECIFYING NON-STANDARD COMMUNICATION FEATURES

BACKGROUND OF THE INVENTION

The present invention relates to a communication apparatus, and particularly but not exclusively to a facsimile interface apparatus for modifying an identifying portion of a facsimile signal which identifies a protocol of a facsimile apparatus transmitting said signal.

DESCRIPTION OF THE PRIOR ART

For the transmission of data between facsimile terminals, standard protocols are adopted to enable the calling and the called terminals to identify the capabilities and to control the operating conditions of each other. Examples of such protocols are those defined by the International Telegraph and Telephone Consultative Committee (CCITT, now renamed ITU-T—International Telecommunications Union—Telecommunications standardization), under Recommendation T.3 and T.4, known respectively as the Group 2 and Group 3 facsimile protocols. Recommendation T.30 defines a protocol for both Group 2 and Group 3 facsimile equipment for communication over a telephone network.

However, such standard protocols allow only a limited set of features to be supported by a facsimile terminal. For example, the set of features supported under the Group 3 protocol include different baud rates, vertical resolutions, scanning and recording widths and paper sizes.

In practice, facsimile terminals are often capable of additional features not recognized by standard protocols. To allow non-standard features to be supported, standard protocols may include, in a pre-message phase in which identifying data is exchanged, an optional non-standard feature (NSF) frame consisting of a country code, a manufacturer's identity code, and proprietary data identifying the specific non-standard features supported. If the calling terminal recognizes the country code and manufacturer's identity code transmitted by the called terminal, it transmits an acknowledgement signal and may subsequently transmit (and the called terminal may receive) facsimile data under a non-standard protocol which allows non-standard features to be supported. If, however, the country code and manufacturer's identity code are not recognized, the calling terminal will not acknowledge the non-standard features and the facsimile data will be transmitted under a standard protocol recognized by any facsimile terminal conforming to this standard.

However, the use of non-standard protocols may give rise to problems in encoding or decoding signals in the circuit between the calling and called terminals.

For example, where it is desired to send a facsimile transmission over a digital link, a facsimile interface unit (FIU) is employed to receive and convert a modulated analogue signal, which is output from a facsimile terminal, to digital data suitable for transmission over the link. The FIU demodulates the signal output from the facsimile apparatus. FIU apparatus is employed, for example, in satellite earth stations, to demodulate and encode facsimile data for the satellite up link.

However, if the original facsimile data is encoded or modulated in a non-standard way, the FIU may be unable to recover the facsimile data from the modulated signal.

An attempt has been made to circumvent the above problem by intercepting the transmitted NSF frame in an FIU connected to the called facsimile terminal, and replacing the entire NSF frame with a series of flags, which the calling terminal interprets as an extension to a preamble which is transmitted before the optional NSF frame. Thus, the NSF frame is effectively erased. However, the proprietary data portion of the NSF frame is of an undefined length and may be very long, so that the flags may be transmitted for a long time. As a result, the calling terminal may time out after the duration of the preamble exceeds an expected maximum and terminate the call without the facsimile data being transmitted.

SUMMARY OF THE INVENTION

The present invention provides a facsimile interface device which receives an identifying signal transmitted by a facsimile apparatus and modifies the identifying signal to generate a predetermined identifying signal which is accepted by a receiving facsimile apparatus The predetermined identifying signal generated by the facsimile interface device is not indicative of any transmitting facsimile apparatus.

Thus, the receiving facsimile apparatus is unable to recognize the identity of the transmitting apparatus, and will therefore revert to a standard protocol which can successfully be decoded by the FIU.

DETAILED DESCRIPTION OF A PREFERRED EMBODIMENT

Figure 1:
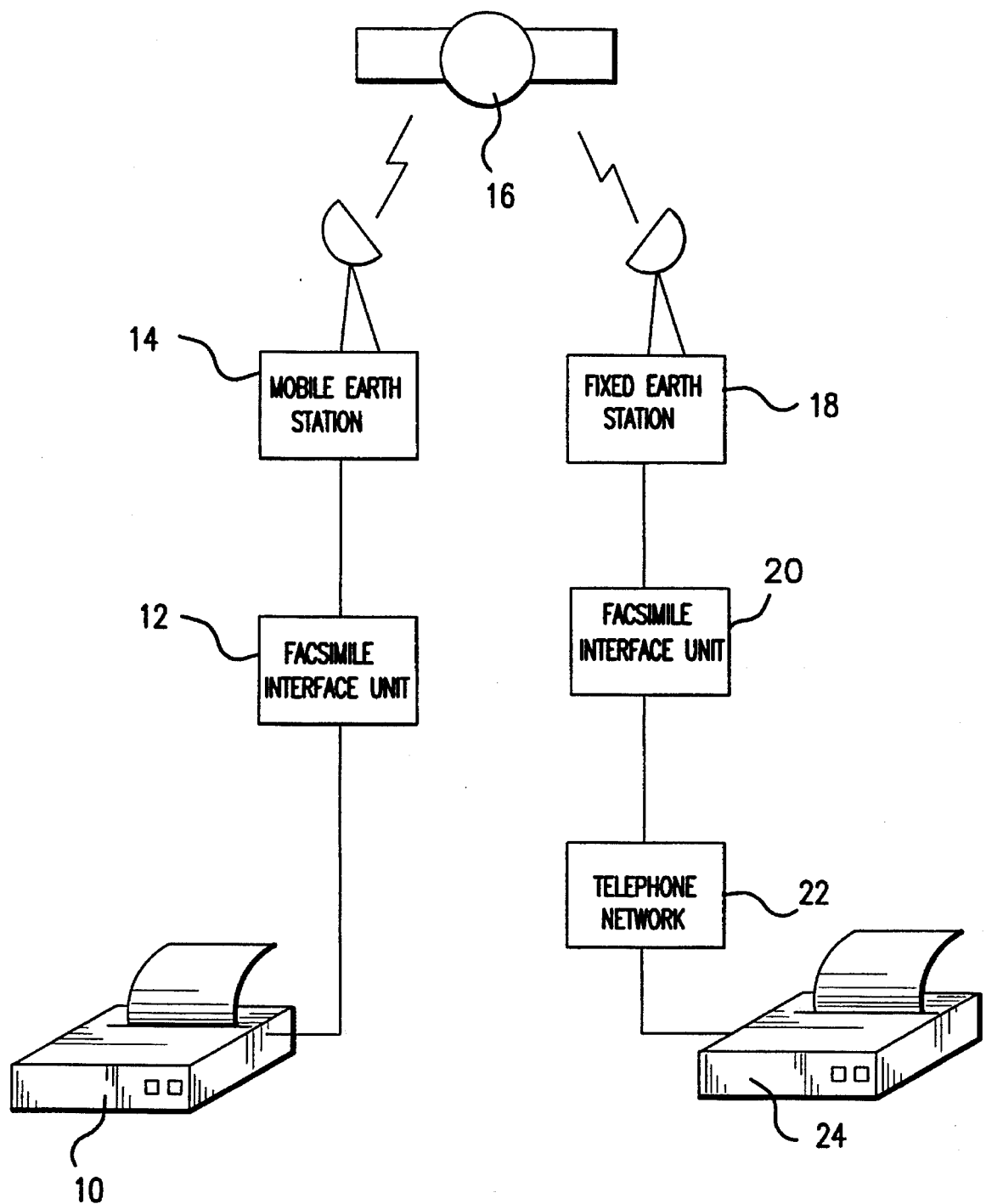
FIG. 1 is a diagram of a circuit between two facsimile terminals, including a satellite link.

In FIG. 1, a calling facsimile terminal 10 is connected to a mobile earth station 14 by means of a facsimile interface unit (FIU) 12. The mobile earth station 14 is designed to communicate directly with a communication satellite 16 which communicates with a fixed earth station 18. The signal is passed to a further facsimile interface unit 20 and is modulated so that it may be transmitted through a telephone network 22 to a called facsimile terminal 24. Likewise, response signals from said called facsimile terminal 24 are transmitted through the same circuit to the calling facsimile terminal 10. In this way, facsimile terminals may communicate via a satellite link to and from a mobile earth station. The mobile earth station may be a portable unit, a unit mounted on a vehicle or a ship, or a temporary installation.

Figure 2:
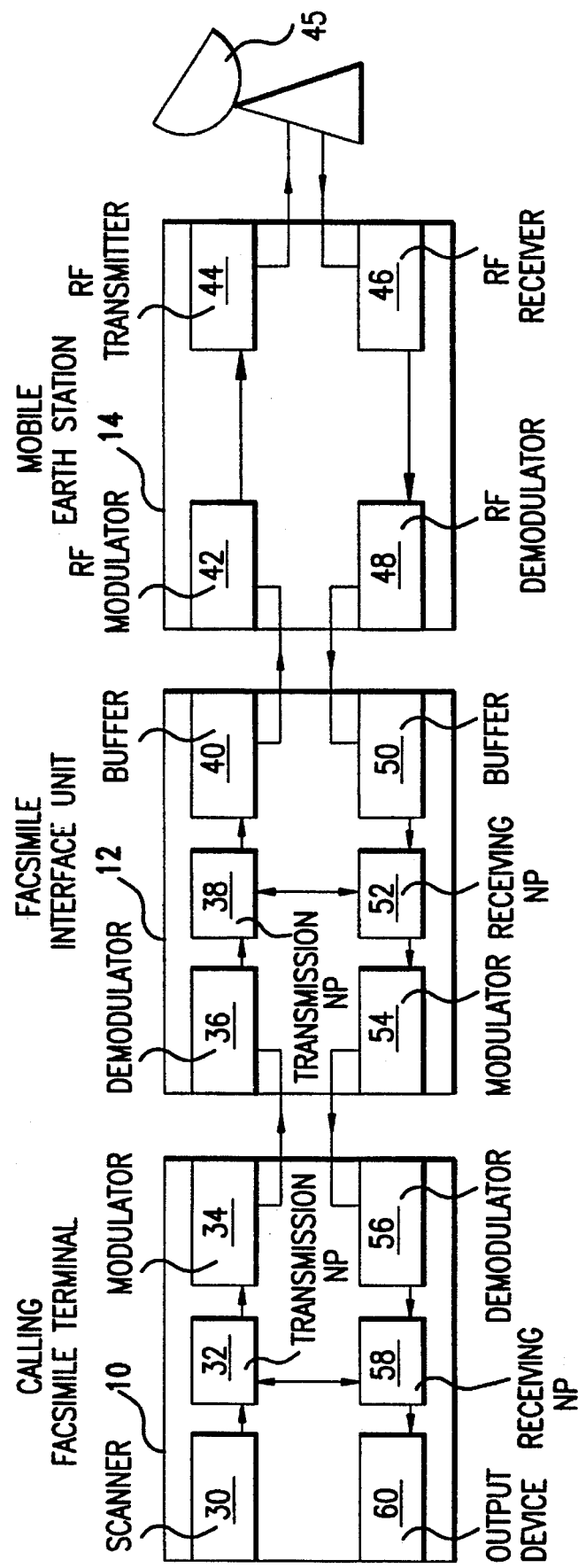
FIG. 2 is a functional block diagram of a facsimile terminal, a facsimile interface unit according to an embodiment of the present invention and a mobile earth station.

As shown in FIG. 2, the calling facsimile terminal 10 comprises an input device 30, such as a scanner for scanning a document or an input port connected to a computer for sending facsimile data, and a facsimile transmission microprocessor 32 which encodes signals from the scanner 30 according to a predetermined algorithm. The facsimile transmission microprocessor 32 also controls the operation of facsimile transmission, including call set-up, pre-message procedure, message transmission, post-message procedure and call release. The output of the facsimile transmission microprocessor 32, in the form of digital data, is modulated by a facsimile transmission modulator 34 to produce an analog output suitable for transmission through a public service telephone network.

The analog output of the facsimile transmission modulator 34 is connected, either directly or through a telephone circuit, to the calling FIU 12, which demodulates the analog output to recover the digital facsimile data. As commercially produced facsimile terminals are not generally provided with a digital output port, it is usually not possible to receive a digital output directly from the calling facsimile terminal 10. The calling FIU 12 comprises a demodulator 36, which converts the modulated signal to digital data, a transmission microprocessor 38 which encodes the data and an output buffer 40 from which encoded data is transferred to the mobile earth station 14. In the mobile earth station 14, the data is modulated by a radio frequency (RF) modulator 42 connected to an RF transmitter 44, which transmits the signal to the satellite 16 by means of an antenna 45 directed at the satellite 16. The calling FIU 12 may be integrated with the mobile earth station 14.

The mobile earth station 14 further comprises an RF receiver 46 for receiving RF signals from the satellite 16, in this case RF signals transmitted by the called facsimile terminal 24. The received signal is demodulated by an RF demodulator 48 to produce a digital signal which is stored in an input buffer 50 in the calling FIU 12. Alternatively, the buffer 50 may be omitted. The digital signal is decoded by an FIU receiving microprocessor 52 and transferred to an FIU receiving modulator 54 which modulates the decoded data to produce an analog output signal suitable for reception by the calling facsimile terminal 10. The received signal is then demodulated by a facsimile receiving demodulator 56 in the calling facsimile terminal 10 to produce digital data, which is decoded by a facsimile receiving microprocessor 58. The facsimile receiving microprocessor 58 controls an output device 60 such as a printer to print a hard copy of the received facsimile, or an output port connected to a computer for receiving facsimile data.

The facsimile terminal 10 and mobile earth station 14 are known per se, and the above description thereof is merely illustrative.

Figure 3:
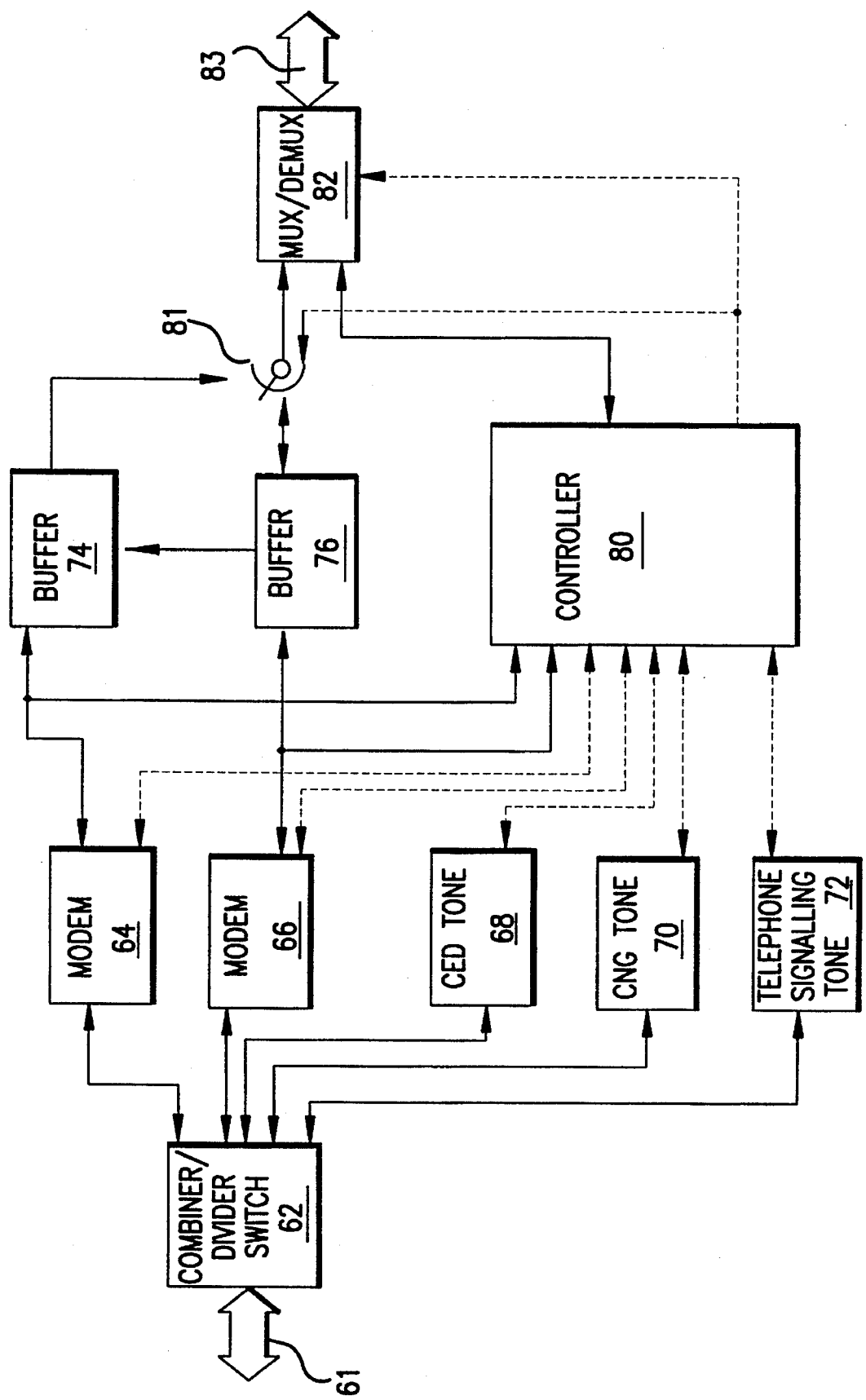
FIG. 3 is a more detailed block diagram of the facsimile interface unit of FIG. 2.

A more detailed diagram of either of the facsimile interface units 12 or 20 is shown in FIG. 3. In this diagram, control lines are shown in dotted outline and data lines are shown in solid outline.

The FIU comprises a 2400 baud modem 64 (as required under CCITT recommendation V.27 ter), a 300 baud modem 66 (as required under CCITT recommendation V.21), a CED tone generator/detector 68 (for generating/detecting a 2100 Hz CED signal which indicates a called non-speech terminal), a CNG tone generator/detector 70 (for generating/ detecting a 1100 Hz CNG signal which indicates an automatic facsimile call) and a telephone signalling tone generator/detector 72, each connected to a combiner/divider switch 62, for combining the outputs of the modems 64 and 66 and of the tone generators 68, 70 and 72 and for dividing a received signal for receipt by each of the modems and tone detectors, which is connected via an input/output connector 61 to the telephone network 22 or the facsimile terminal 10.

The operation of the modems 64, 66 and tone generators/ detectors 68, 70, 72 is controlled by a controller 80 which corresponds functionally to the microprocessors 38 and 52. The controller 80 is also connected to receive data from the modems 64 and 66 so as-to monitor signals received by them, and to receive signals from the tone generators/ detectors 68, 70 and 72 indicating that a tone has been detected. Buffers 74 and 76, which correspond functionally to the buffers 40 and 50, are connected to exchange data with the modems 64 and 66 respectively. The FIU may include additional 9600 and 14400 baud modems if these baud rates are supported in the digital link or telephone network.

On the earth station side of the FIU, the buffers 74 and 76 are connected to a multiplexer/demultiplexer 82 via a data switch 81, under the control of the controller 80 (e.g. a microprocessor). The controller 80 is also connected to send data signals through the multiplexer/demultiplexer 82. An input/ output connector 83 connects the multiplexer/demultiplexer 82 to the relevant earth station 14 or 18.

When the calling facsimile terminal 10 is to send a facsimile message, the microprocessor 32 initiates a call to the facsimile terminal to be called. The called terminal 24 connects to the network and sends a CED signal which indicates the presence of a facsimile terminal.

Figure 4:
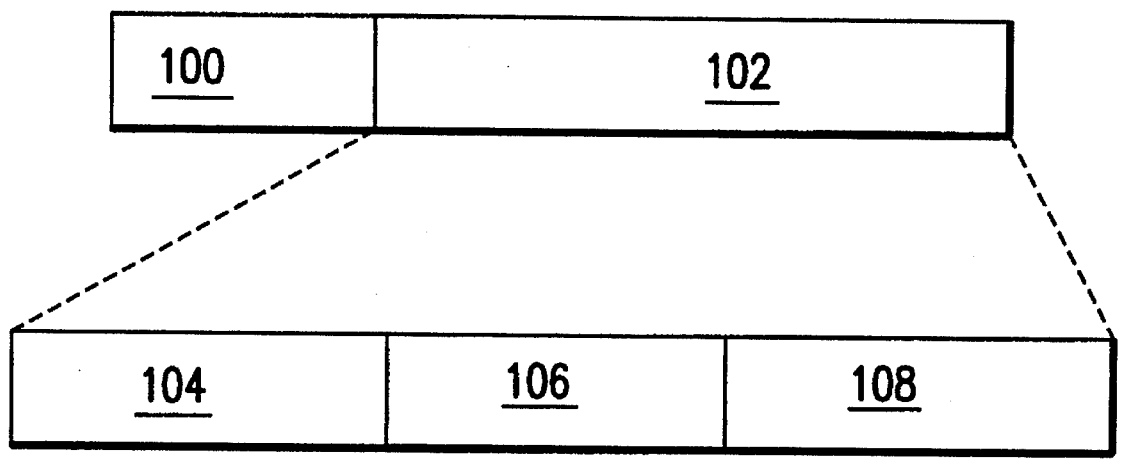
FIG. 4 is a chart showing the format of an initial identification frame sent by a facsimile terminal.

The called terminal 24 then sends an initial identification frame as shown in FIG. 4 comprising a preamble 100 consisting of a series of flags which are encoded as Hex 7E, followed by binary coded information 102. The binary coded information comprises an optional non-standard features frame 104, which identifies non-standard features supported by the called terminal 24, an optional called subscriber identification frame 106, which provides the specific identity of the called terminal 24, for example its international telephone number, and a digital identification frame 108, which identifies the standard features of the called terminal 24 as described by the Group 3 protocols.

Figure 5A:
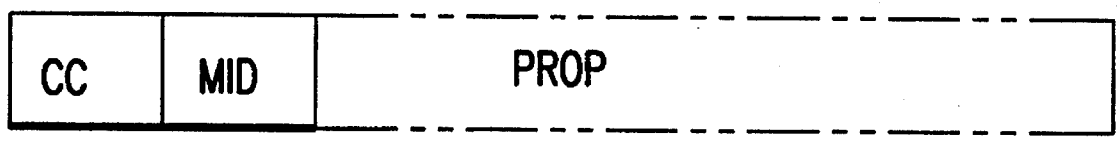
FIG. 5a is a chart showing the format of an NSF frame as sent by a facsimile terminal.

The format of the non-standard features frame 104 is shown in FIG. 5a. The NSF frame comprises an 8-bit country code (CC) followed by the manufacturer's identity code (MID) of a fixed length, and proprietary data (PROP) of a variable length, which is peculiar to each manufacturer. The country code CC, which identifies the country in which the manufacturer of the facsimile terminal has been allocated an MID, is defined under CCITT Recommendation T.35.

In response to the initial identification signal, the calling terminal 10 sends a "command to receive" frame including a digital command frame which identifies the standard features to be supported during subsequent transmission, and an optional non standard features set-up frame which establishes the non-standard features to be supported.

If the calling facsimile terminal 10 recognizes the country code CC and the manufacturer's identity code MID, which may occur if the calling and called terminals are made by the same manufacturer, the non-standard features of the calling terminal 10 are enabled and the non-standard features set-up frame sent by the calling terminal 10 enables the non-standard features of the called terminal 24 and the subsequent transmission no longer necessarily complies with the Group 3 protocol.

Non-standard features supported by particular types of facsimile terminal may include non-standard modulators/ demodulators which have high baud rates, or non-standard protocols. However, in the circuit shown in FIGS. 1 and 2, the use of non-standard features may render the FIUs 12 and 24 incompatible with their respective facsimile terminals 10 and 20 since, for example, the modem 64 and 66 may be unable to demodulate the signals from a non-standard modulator (for example if the baud rate is too high). In that case, the facsimile terminals 10 and 24 will be unable to communicate with each other, although both terminals are capable of using the Group 3 protocol, because they have been set during the identification procedure to use the manufacturer's non-standard baud rates or protocols.

Figure 5B:
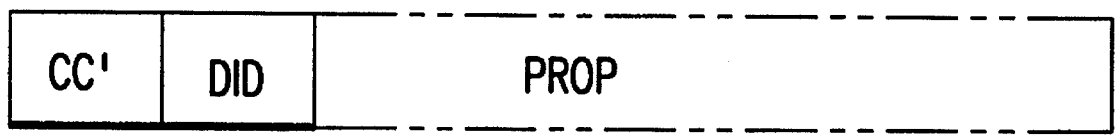
FIG. 5b is a chart showing the format of an NSF signal as modified by the facsimile interface unit of FIG. 2.

In a preferred embodiment of the present invention, the controller 80 of the called FIU 20 is arranged to receive the NSF frame transmitted by the called facsimile terminal 24 and to transmit to the fixed earth station 18 a modified NSF signal as shown in FIG. 5b, in which the MID is replaced by a dummy identifying code DID which is reserved by the operator of the satellite link and which no manufacturer is free to use. The dummy identifying code may identify only a standard protocol and not any non-standard protocol. In one preferred embodiment, the dummy identification code does not identify any type of facsimile apparatus, and may include a modified manufacturer's identity code. Preferably, to avoid having to reserve a DID in each country, the country code CC is also replaced by a country code CC' of the country in which the DID is reserved. The proprietary data of the NSF frame are preferably unmodified, or may optionally be replaced by random bits or zeros.

When the calling terminal 10 receives the DID, it fails to recognize the identifying code and transmits to the called terminal 24 the digital command frame, which identifies Group 3 standard features, but not the non-standard features set-up frame.

Thus, the calling and called terminals 10 and 24 revert to the Group 3 standard protocol, which is compatible with the FIUs 12 and 20, and a reliable circuit is provided for facsimile transmission via a satellite link.

While in the above example the terminal 10 connected to the mobile earth station 14 is the calling terminal, the above procedure is also followed when the terminal 24 connected to the fixed earth station 18 is the calling terminal, but with the modification of the identifying signal taking place in the FIU 20 connected to the telephone network 22.

It should be noted that the calling terminal need not subsequently transmit the facsimile data. Under Recommendation T.30 the calling terminal may send a "command to send" frame instead of the command to receive frame. The "command to send" frame identifies the calling terminal's capabilities, but instructs the called terminal to transmit facsimile data.

Although in the preferred embodiment the transmitted NSF frame is modified in the called FIU 20, the NSF frame could instead be modified in the calling FIU 12, after transmission over the satellite link.

Other variants of the present invention may be contemplated by the skilled person. For example, the FIU receiving a non-standard features frame may replace the country code CC by another country code CC' in the range Hex C5 to Hex CF, which is not allocated under Recommendation T.35, or which represents a country which has no official body appointed to allocate an MID, or is otherwise unlikely to be recognized by any facsimile terminal. In that case, it may not be necessary to modify the MID.

Furthermore, the present invention may be applied to similar situations in which a non-standard protocol will not be recognized in a data transmission circuit between transmitting and receiving apparatus.

Such and other variants which may be contemplated by the skilled person are nevertheless considered to fall within the spirit and scope of the invention.

I claim:

1. A device for modifying a signal transmitted by a first apparatus for reception by a second apparatus, said first apparatus supporting both a standard communications protocol and a non-standard communications protocol comprising:

means for receiving said signal from the first apparatus;

means for detecting a portion of said signal which identifies said non-standard communications protocol supported by the first apparatus;

means for replacing said portion with a predetermined signal; and means for transmitting a modified signal derived from said received signal and including said predetermined signal in a protocol identifying field to the second apparatus, said modified signal identifying only said standard protocol.

2. A device as claimed in claim 1, wherein said first and second apparatus are facsimile apparatus.

3. A device as claimed in claim 2, wherein said portion of the received signal includes a manufacturer's identity code and said predetermined signal includes a dummy manufacturer's identity code selected so as to be unrecognizable to the second apparatus.

4. A device as claimed in claim 1, wherein said signal is modulated and said means for receiving includes a demodulator for demodulating said signal.

5. A device as claimed in claim 4, wherein said demodulator is an RF demodulator and said means for receiving includes an RF receiver.

6. A device as claimed in claim 1, wherein said means for transmitting includes a modulator for modulating said modified signal.

7. A device as claimed in claim 6, wherein said modulator is an RF modulator and said means for transmitting includes an RF transmitter.

8. A method of disabling communication using non-standard features, comprising the steps of:

receiving a signal from a first communication apparatus, said signal including an identity code identifying said non-standard features;

modifying said signal to replace the identity code with a dummy identity code in an identity code field, said dummy identity code not identifying said non-standard features; and transmitting said modified signal to a second communication apparatus, thereby preventing said second communication apparatus from receiving the identity code from said first communication apparatus in such a way as to indicate that said non-standard features are supported.

9. A method as claimed in claim 8, wherein said first and second apparatus are facsimile communication apparatus.

10. A method as claimed in claim 8 further comprising the steps of:

receiving said modified signal at the second communication apparatus; and communicating between the first communication apparatus and the second communication apparatus using a standard protocol.

11. A method as claimed in claim 8, wherein said transmitting step includes encoding said modified signal.

12. A method as claimed in claim 8, wherein said transmitting step includes radio frequency modulating said modified signal.

13. A method as claimed in claim 8, wherein said receiving step includes radio frequency demodulating said signal.

14. A method as claimed in claim 13, wherein said standard communications protocol is a facsimile transmission protocol as defined in ITU Recommendation T.30 and said protocol identity code comprises a manufacturer's identity code and/or a country code within a non-standard features field as defined in said Recommendation.

15. In a communication between a first communication apparatus and a second communication apparatus each able to support both a standard communications protocol and a non-standard communications protocol and being connected via interface apparatus, a method comprising the steps of:

transmitting a protocol identity code from the first communication apparatus, said protocol identity code indicating that the non-standard communications protocol is supported by the first apparatus;

receiving the protocol identity code at the interface apparatus;

in response to receipt of the protocol identity code, transmitting from said interface apparatus a dummy identity code in a protocol identity field, said dummy identity code not indicating that the non-standard communications protocol is supported;

receiving said dummy identity code at the second communication apparatus and communicating between said first and second communication apparatus using said standard communications protocol.

16. A device for modifying a signal transmitted by a first apparatus for reception by a second apparatus, said first apparatus supporting both a standard and a non-standard communications protocol comprising:

a receiver for receiving said signal;

a detector for detecting a portion of said signal which identifies said non-standard communications protocol supported by said first apparatus;

a modified signal generator for generating a modified signal derived from said received signal, wherein the modified signal includes a non-standard communications protocol field but does not identify said non-standard communications protocol; and a transmitter for sending said modified signal to said second apparatus.

17. The device according to claim 16, wherein said modified signal generator generates said modified signal by replacing said portion of the received signal which identifies the non-standard communications protocol with a predetermined signal in said non-standard communications protocol field which does not identify any non-standard protocol.

18. Facsimile interface apparatus for coupling between a first facsimile apparatus and a second facsimile apparatus different from the first facsimile apparatus, comprising:

a demodulator for receiving a modulated analog facsimile signal from the first facsimile apparatus and destined for the second facsimile apparatus, and for generating digital facsimile data therefrom;

means for detecting data that identifies a non-standard protocol supported by the first facsimile apparatus in said facsimile data;

means for replacing the detected data with predetermined data that does not identify any non-standard protocol to thereby produce modified facsimile data; and means for generating for transmission to the second facsimile apparatus a modified analog facsimile signal from the modified facsimile data.

19. Apparatus as claimed in claim 18, wherein said detected data includes a manufacturer's identity code and said predetermined data includes a dummy manufacturer's identity code.

20. A method of modifying facsimile signals transmitted from a first facsimile apparatus for reception by a second facsimile apparatus, comprising:

receiving a facsimile signal from said first facsimile apparatus;

detecting a signal that identifies the type of said first facsimile apparatus in said facsimile signal; and replacing the detected signal with a predetermined identifying signal which does not identify any type of facsimile apparatus; and sending the predetermined identifying signal to said second facsimile apparatus.

21. A method as claimed in claim 20, wherein said predetermined identifying signal is of the same format as said detected signal.

22. A method of disabling facsimile communication using non-standard features, comprising:

receiving a non-standard features signal from a first facsimile apparatus, said non-standard features signal including a protocol identity code;

modifying said non-standard features signal to replace said protocol identity code with a predetermined dummy identity code; and transmitting said modified non-standard features signal to a second facsimile apparatus, thereby preventing said second facsimile apparatus from receiving a signal from said first facsimile apparatus that indicates that non-standard features are supported.

23. Facsimile interface apparatus, having an input for connection to a transmitting facsimile apparatus and an output for connection to a receiving facsimile apparatus, comprising:

a processor for detecting the reception at said input of data that identifies a non-standard protocol supported by the transmitting facsimile apparatus and for generating at the output, in response to detecting the data, predetermined protocol identity data that does not identify any non-standard protocol;

whereby the data detected at the input is replaced by said predetermined protocol identity data at the output.

24. Facsimile interface apparatus as claimed in claim 23, wherein the data detected at said input includes a manufacturer's identity code and said predetermined protocol identity data includes a dummy manufacturer's identity code.

25. Facsimile interface apparatus as claimed in claim 23, further comprising:

a demodulator, coupled to said processor, for receiving a modulated analog facsimile signal from said transmitting facsimile apparatus and for generating digital facsimile data therefrom.

26. Facsimile interface apparatus as claimed in claim 25, further comprising:

a modulator, coupled to said processor, for generating a modified analog facsimile signal from at least said predetermined protocol identity data.

* * * * *